United States Patent [19]
Smith

[11] 3,880,576
[45] Apr. 29, 1975

[54] METHOD FOR LIGHTING A MAIN BURNER FOR HEATING HIGH VELOCITY HIGH PRESSURE TURBULENT AIR

[75] Inventor: Ivan L. Smith, Port Arthur, Tex.

[73] Assignee: Texaco Inc., New York, N.Y.

[22] Filed: Apr. 22, 1974

[21] Appl. No.: 462,671

Related U.S. Application Data

[60] Continuation-in-part of Ser. No. 368,796, June 11, 1973, abandoned, which is a division of Ser. No. 201,011, Nov. 22, 1971, Pat. No. 3,768,964.

[52] U.S. Cl. ............................................. 432/29
[51] Int. Cl. ............................................. F23l 9/04
[58] Field of Search ....... 431/278, 285, 353, 8, 354; 432/222, 29

[56] References Cited
UNITED STATES PATENTS

| | | | |
|---|---|---|---|
| 1,436,433 | 11/1922 | Coberly | 431/354 |
| 1,498,644 | 6/1924 | Clark | 431/353 |
| 1,670,147 | 5/1928 | Gault | 431/353 |
| 2,504,592 | 4/1950 | Scharbau et al. | 431/278 |
| 2,508,792 | 5/1950 | Ludwig | 432/222 |
| 3,025,875 | 3/1962 | Stover | 137/606 |
| 3,341,119 | 9/1967 | Tyler | 431/278 |
| 3,536,429 | 10/1970 | Lake | 431/353 |
| R25,626 | 7/1964 | Yeo et al. | 432/222 |

*Primary Examiner*—Carroll B. Dority, Jr.
*Attorney, Agent, or Firm*—T. H. Whaley; C. G. Ries; Theron H. Nichols

[57] ABSTRACT

A method for lighting a main burner with a new pilot system comprises utilizing precisely formed sharp edge restrictive orifices in the gas and air supply lines for providing a gas-air combustible mixture for flowing downstream to an orifice-diffuser pilot for instantaneous lighting thereof and for insuring steady burning with no flame-out when heating high pressure high velocity turbulent air.

5 Claims, 4 Drawing Figures

3,880,576

METHOD FOR LIGHTING A MAIN BURNER FOR HEATING HIGH VELOCITY HIGH PRESSURE TURBULENT AIR

This is a continuation-in-part of application Ser. No. 368,796, filed June 11, 1973, now abandoned, a division of application Ser. No. 201,011, filed Nov. 22, 1971 and now U.S. Pat. No. 3,768,964.

BACKGROUND OF THE INVENTION

A typical air heater for a fluid catalytic cracking unit comprises a gas burner for heating a large mass of high velocity turbulent air under several psig (pounds per square inch gauge) pressure from a powerful air blower and for supplying the heated air to a regenerator of a fluid catalytic cracking unit during startup of the unit. The main burner is lighted from a gas fired pilot which has previously been lighted from an electrical spark igniter. The usual and average time of 10 hours, with a maximum of 24 hours has been required by operators in the past to successfully light the pilot and have it stay lighted until the main burner can be lighted. This is due to the trial and error method of adjusting the fuel to arrive at a combustible mixture with the air available at the burner in the heater and the ease in which the flame can be blown out due to the tremendous turbulence of the air in the heater.

The disclosed turbulent air heater and method for lighting thereof provides a pre-mix of compressed air and fuel gas in the combustible range for the pilot, with the correct combination of restrictive orifices and upstream pressure settings and particularly for air heater pressures not exceeding 15 psig, for example.

OBJECTS OF THE INVENTION

A principal object of this invention is to provide a method for lighting a turbulent air heater which takes much less than the average 10 hours to ignite a main air burner for heating air, as for example, for a fluid catalytic cracking unit.

Another principal object of this invention is to provide a method for lighting a pilot for a turbulent air heater that will provide an instantaneous pilot flame having steady burning with no flame out in the heater for heating turbulent high velocity air.

Other objects and various advantages of the disclosed method for lighting a pilot and turbulent air heater combination will be apparent from the following detailed description, together with the accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, one apparatus for performing the method of the invention wherein like reference numerals designate corresponding parts in the several views in which.

The invention disclosed herein, the scope of which being defined in the appended claims is not limited in its application to the details of construction and arrangement of parts shown and described, since the invention is capable of other methods and embodiments and of being practiced or carried out in various other ways. Also, it is to be understood that the phraseology or terminology employed herein is for the purpose of description and not of limitation.

DESCRIPTION OF THE PREFERRED EMBODIMENT FOR PERFORMING THE PREFERRED METHOD

Figure 1:
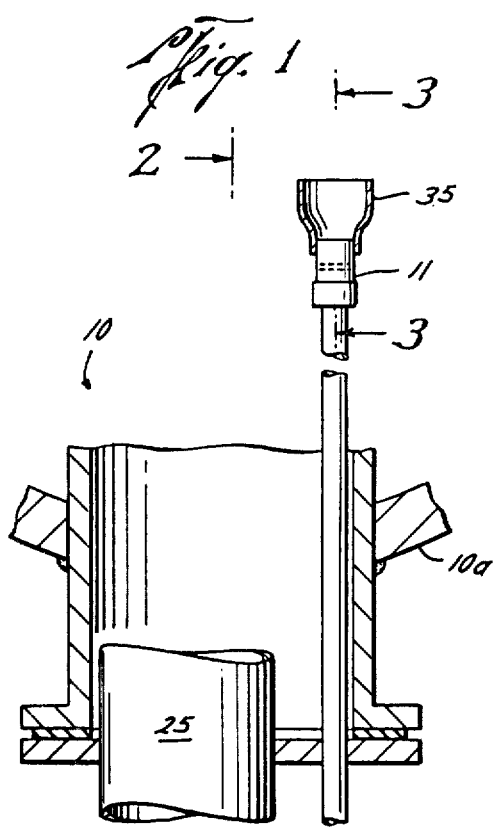
FIG. 1 is a schematic perspective view of the heater-pilot system for a typical fluid catalytic cracking unit with parts deleted for clarity of disclosure.

FIG. 1 is a schematic view of an air heater 10, with parts cut away, having a housing 10a with a pilot 11 therein. Lines 12 and 13 provide air and gas, respectively, for being mixed for the pilot 11. The disclosed examplary heater is for a fluid catalytic cracking unit. Air is supplied through valve 14 to the one-inch pipe 12 past a pressure gauge 15, which air is preferably held to approximately 50 psig (pounds per square inch gauge), and passes through a sharp edge restrictive orifice, such as but not limited to an orifice union 16 having an inside diameter for example, of 0.138 inches, for controlling the air flow through one arm of a "T" 17, and then through another valve 18 in the neck of the T which forms the beginning of a 1½ inch mixture line or mixing chamber 19. Likewise, pilot fuel gas, such as natural gas, is supplied through a valve 20 to the 1 inch line 13. The fuel gas passes by a gas pressure gauge 21, which gas likewise is held preferably at approximately 50 psig. This gas then passes through another sharp edge restrictive orifice, such as but not limited to an orifice union 22 having an internal diameter, for example, of 0.098 inches, wherein from there the gas passes to the other arm of the T 17 and then to the mixing chamber 19 where the gas is mixed with the air. From this area the gas-air mixture exits at a pressure not exceeding 15 psig, for example, as indicated by a pressure gauge 23. This gas-air mixture passes on to the pilot 11 of the heater 10, FIG. 1.

Valve 18 in mixing chamber line 19 is normally open while the pilot is being used and is closed when use of the pilot is no longer required. The sharp edge restrictive orifice may be formed from a thin plate or from a thick plate with the portion including the orifice being ground down to provide a sharp edge orifice. In regard to orifices 16 and 22, with a pressure as $P_1$, on the upstream side of each orifice and a pressure as $P_2$ on the downstream side of each orifice, the flow through each orifice is constant for all pressures of $P_2$ that do not exceed 0.55 $P_1$, $P_1$ and $P_2$ being absolute pressures.

Figure 2:
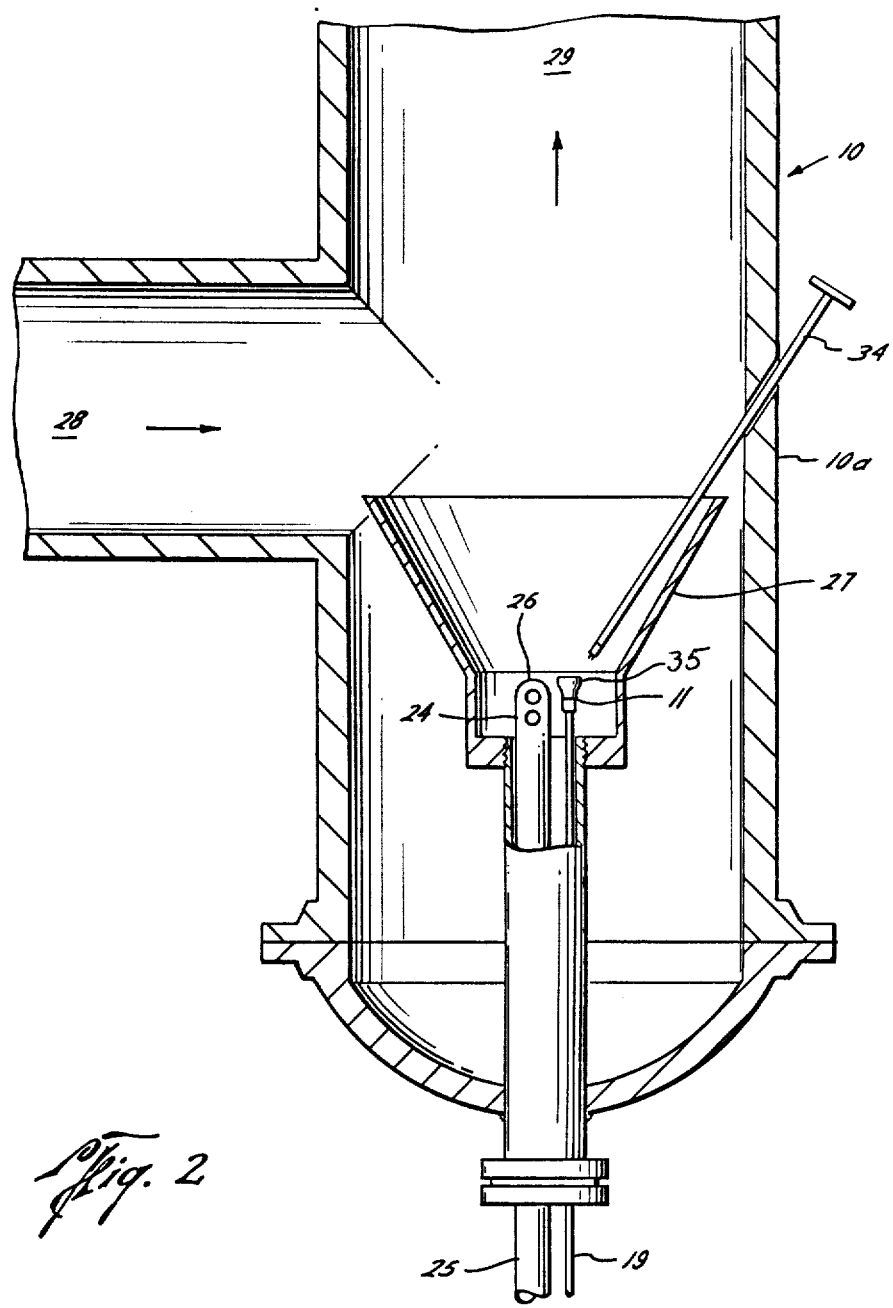
FIG. 2 is a section taken at 2–2 on FIG. 1.

FIG. 2, a sectional schematic view at 2—2 on FIG. 1, illustrates a main burner 24, FIG. 2, having a gas line 25 for supplying raw gas to a gas tip 26. The gas escaping from the tip 26 aspirates air from therearound to provide a proper gas-air mixture in a main heater diffuser 27 mounted in the air heater 10 over the gas tip. The pilot 11 has an expanding section or burner diffuser 35 forming the egressing end thereof. The diffuser 35 is preferably 4 inches long with ingressing and egressing openings being approximately 2½ inches and 4 inches, respectively.

The pilot 11, FIG. 2, is mounted in juxtaposition with the main gas burner 24 having the tip 26 and extends up to the bottom of the main heater diffuser 27 to substantially the same height as the burner tip. The pilot 11 utilizes a self-contained independent gas-air mixture from the line 19 whereas the main gas burner 24 uses the pure or raw gas and mixes it with the air drawn in by aspiration. Therefore the pilot is not affected by adjustments and fluctuations of the air in the main air heater 10.

As shown in FIG. 2, a spark ignitor tube 34 is mounted in the heater 10 and extends down over and adjacent to the pilot 11. After being lighted by the spark igniter tube 34, the pilot 11 then ignites the main burner 24 of the heater 10 and its flame is held within the main diffuser mounted thereover. The feature of the selfcontained independent pilot gas-air mixture system accordingly provides an instantaneous pilot flame having steady burning with no flame-out.

Tue turbulent and high velocity air at 300° F., for example, to be heated may be injected into the heater 10 at right angles through air inlet 28 from the left, as shown in FIG. 2, for example, producing very turbulent air. A typical installation which generates and heats very turbulent air and either very low pressure air as under a vacuum or high pressure air, as at 35 psig (pounds per square inch, gauge), and in which the new pilot has been very successful, is one in which the longitudinal axis of the main air heater diffuser 27 and burner diffuser 35 are mounted at right angles to the incoming air so that the air passes directly over the heater, is heated as it passes thereover prior to turning 90° F., and subsequently leaves the heater through exit duct 29. Typical inlet and exhaust ducts, 28 and 29, are 4 feet and 6 feet in diameter, respectively. Duct 29 may exhaust 350,000 cfm (cubic feet per minute) of air at 1000° F. and 35 psia, for example.

Figure 3:
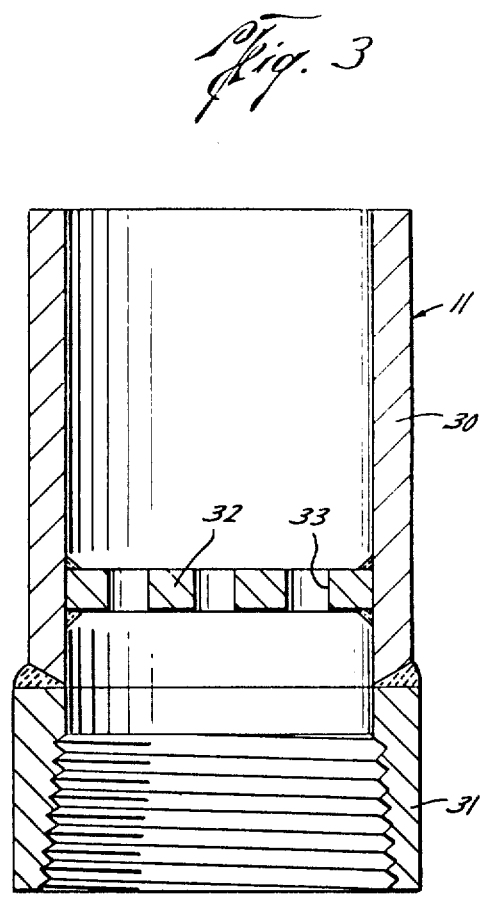
FIG. 3 is a section taken at 3–3 on FIG. 2.

FIG. 3, a sectional schematic view at 3—3 on FIG. 1 illustrates the novel pilot 11 with burner diffuser 35 deleted. This pilot comprises a cylinder 30 for being secured to the pilot gas-air mixture line (not shown) with a coupling 31 welded to one end of the cylinder, the other or exit end of the cylinder being open for transmission of the gas-air mixture to the burner diffuser 35, FIG. 1, connected thereto. Positioned intermediate of the two ends of the pilot cylinder is a quarter inch stainless steel orifice plate 32, FIG. 3, which plate of the preferred embodiment has an inside diameter of 1.939 inches for a cylinder length including the coupling of 6 inches. This preferred embodiment of the pilot has a coupling with threads 1 inch long made from 1½ inches stainless steel and spaced a quarter of an inch from the weld joint between the coupling and the cylinder. The orifice plate 32 is welded in the cylinder at a distance of one-half inch from the coupling end. The distance from the back surface of the orifice plate 32 to the exit end of the cylinder 30 is substantially 4 inches. The cylinder 30 is made from 2 inches stainless steel pipe.

These restrictive orifices 16 and 22 provide critical flow of the gas-air mixture as it flows to the point of mixing in the neck of T 17. These orifices 16 and 22 must be designed to provide critical flow for the particular operating pressures, psia (pounds per square inch, absolute pressure) utilized or the pressure of the downstream fuel mix must be equal to or less than 55 percent of the pressure upstream.

Figure 4:
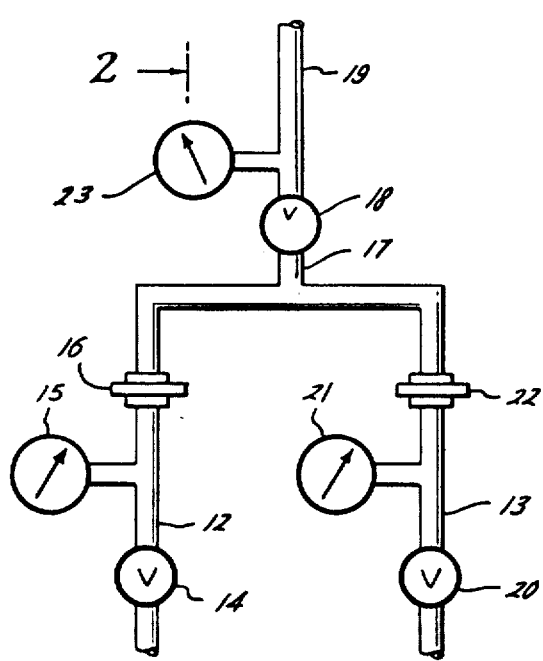
FIG. 4 is a plan view of the orifice plate of FIG. 3.

The orifice plate 32 is illustrated in greater detail in FIG. 4. The examplary orifice plate 32 comprises a round plate with nine holes 33, each hole being three-eighths inch in diameter with eight holes equally spaced on a 1⅛ inches diameter circle on the circular plate, with the ninth hole being in the center of the plate. This ensures that the orifices pass the independently supplied pilot gas-air fuel mixture at a higher velocity than the pilot fuel flame propagation rate to prevent flashback of the flame. The pilot diffuser 35, FIG. 1, slows the passage of the pilot gas-air mixture therethrough to a velocity less than that of the pilot fuel flame propagation rate so that instant ignition will occur when the igniter 34 is energized. The diffuser 35 also shields the pilot flame from the turbulent air and provides steady burning with no flame-out.

Accordingly, it will be seen that the disclosed method performed by the present turbulent air heater and pilot combination operates in a manner which meets each of the objects set forth hereinbefore.

While only one method performed by only one embodiment of the invention has been disclosed, it will be evident that various other methods and modifications are possible in the arrangement and construction of the disclosed turbulent air heater and pilot combination without departing from the scope of the invention, and it is accordingly desired to comprehend within the purview of this invention such methods and modifications as may be considered to fall within the scope of the appended claims.

I claim:

1. In a hot air heater having a main burner for heating high velocity, high pressure, substantially greater than atmospheric pressure turbulent air therein, an orifice-diffuser pilot comprising an orifice plate, combustion chamber, and a diffuser adjacent the main burner, and a main heater expanding diffuser chamber means surrounding the main burner and pilot, a method comprising the steps of, a. passing high pressure air through a precisely formed sharp edge restrictive orifice and then downstream to a mixing chamber, b. passing high pressure fuel gas through a second precisely formed sharp edge restrictive orifice and then downstream to the mixing chamber, c. controlling the upstream supply of fuel gas and air through their respective sharp edge restrictive orifices for providing a combustible mixture down to a pressure of at least 55 percent of the pressure upstream of the orifices, d. passing said controlled combustible mixture through the pilot orifice plate, combustion chamber, and diffuser for instantly lighting the orifice-diffuser pilot adjacent the main burner for lighting the main burner, and e. passing the high velocity high pressure turbulent air over the main heater expanding diffuser chamber means for being heated while the main burner maintains steady burning with no flame-out when heating the high pressure turbulent air therein.

2. In a hot air heater having a main burner for heating high velocity high pressure substantially greater than atmospheric pressure turbulent air therein, an orifice-diffuser pilot comprising an orifice plate, combustion chamber and a diffuser adjacent the main burner, and a main heater expanding diffuser chamber means surrounding the main burner and pilot, a method for forming a pilot system for the main burner comprising the steps of, a. connecting an air supply line to one arm of a T-joint, b. mounting a precisely formed sharp edge restrictive orifice in the air supply line,
c. connecting a fuel gas supply line to another arm of the T-joint,
d. mounting a second precisely formed sharp edge restrictive orifice in the fuel gas supply line,
e. forming a neck on the T-joint connected to a mixing chamber for receiving the fuel gas and air therein,
f. forming the restrictive orifice-diffuser pilot in the main burner for receiving the fuel gas-air mixture,
g. forming control means in the air supply line and the fuel gas supply line for controlling the upstream supply of air and fuel gas through their respective sharp edge restrictive orifices for providing a combustible mixture down to a pressure of at least 55 percent of the pressure upstream of the orifices,
h. forming means for passing said controlled combustible mixture through the pilot orifice plate, pilot combustion chamber, and pilot diffuser for instantly lighting the restrictive orifice-diffuser pilot adjacent the main burner for lighting the main burner, and
i. forming means for passing the high velocity high pressure turbulent air over the main heater expanding diffuser chamber means for being heated while the main heater maintains steady burning with no flame-out when heating the high pressure turbulent air therein.

3. A method as recited in claim 2 wherein the restrictive orifice-diffuser pilot is formed by the method steps of,
a. connecting a cylinder to the mixing chamber for receiving the pilot fuel gas-air mixture,
b. rigidly securing the orifice plate in the cylinder intermediate the ends of the cylinder for receiving the gas-air mixture from the mixing chamber and for forming the combustion chamber downstream of the orifice plate, and
c. forming a pilot diffuser on the downstream end of the cylinder for receiving the gas-air fuel mixture from the pilot diffuser and then burning the fuel mixture in the pilot combustion chamber and diffuser for providing an instantaneous flaming pilot system having steady burning in the pilot and main burner with no flame-out when heating high pressure high velocity turbulent air.

4. A method as recited in claim 3 wherein the method further comprises,
a. connecting a valve and pressure gauge in each air supply line and gas supply line upstream of the sharp edge restrictive orifice in each of the respective lines for forming the control means and for monitoring the upstream pressure for the particular precise orifice in each of the lines for ensuring a predetermined pressure in the downstream gas-air mixture.

5. In a hot air heater having a main burner for heating high pressure high velocity turbulent air therein, and orifice-diffuser pilot comprising an orifice plate, combustion chamber, and a diffuser adjacent the main burner, and a main heater expanding diffuser chamber means surrounding the main burner and pilot, a method for forming a pilot system for lighting the main burner comprising the steps of,
a. forming a precise sharp edge restrictive orifice in an air supply line to a mixing chamber,
b. forming a control valve in the air supply line on the upstream side of the sharp edge restrictive orifice,
c. forming a second precise sharp edge restrictive orifice in a fuel gas supply line to the mixing chamber,
d. forming a second control valve in the fuel gas supply line on the upstream side of the sharp edge restrictive orifice,
e. forming a restrictive orifice-diffuser pilot in the main burner combustion chamber for receiving the fuel gas and air mixture,
f. forming both of the sharp edge restrictive orifices to precise predetermined values to provide a combustible mixture at a pressure down to at least 55 percent of the pressure upstream of the orifices,
g. forming means for supplying the combustible mixture through the pilot orifice plate, combustion chamber, and diffuser, and
h. forming means for passing the high velocity high pressure turbulent air over the main heater expanding diffuser chamber means for being heated wherein the main burner is ensured of steady burning with no flame-out when heating the high pressure high velocity turbulent air therein.

* * * * *